2,863,896
PREPARATION OF PURE ALUMINUM ALKYLS

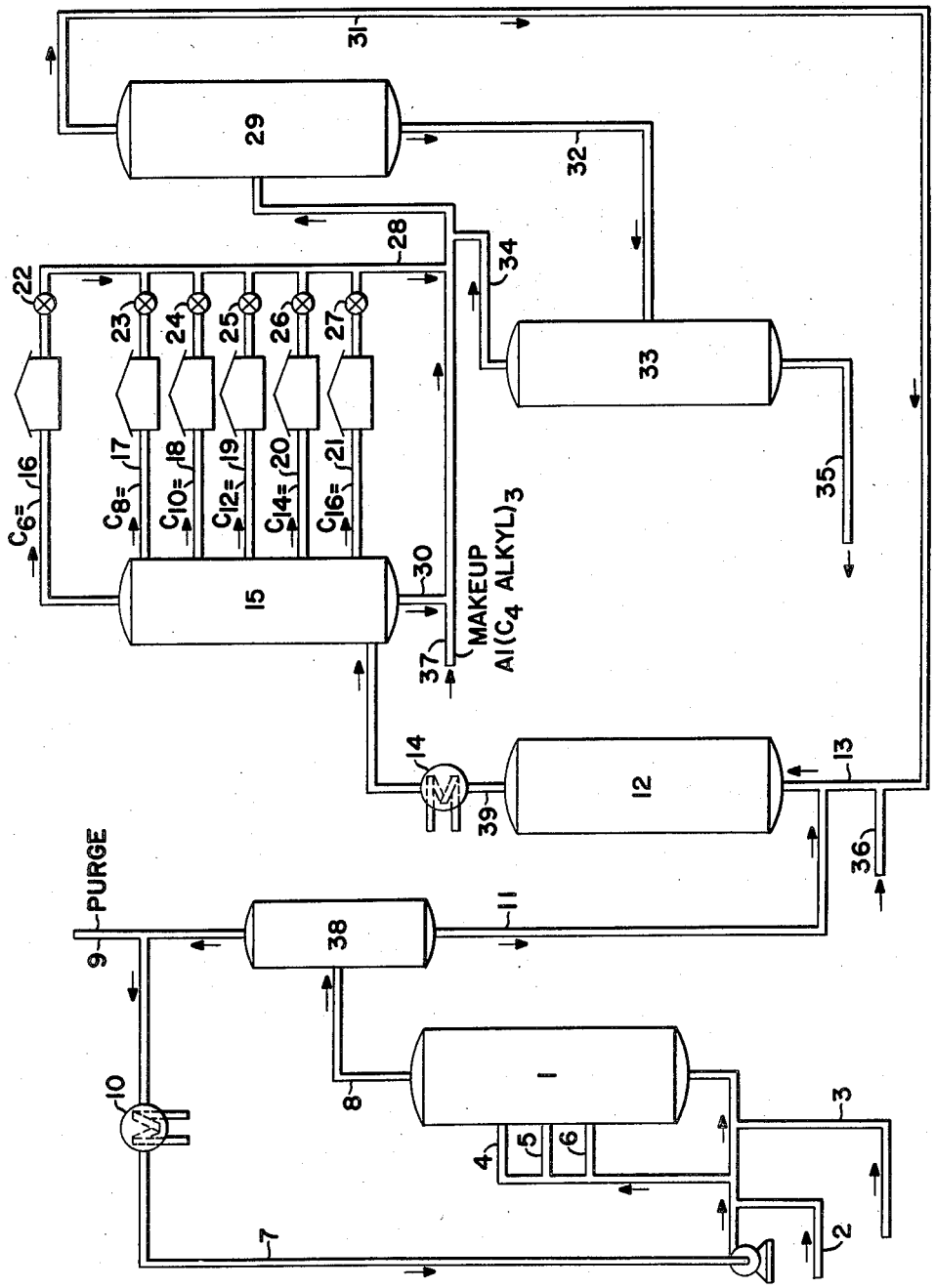
John F. Johnson Inventor

John F. Johnson, Plainfield, N. J., assignor to Esso Research and Engineering Company, a corporation of Delaware Application July 11, 1956, Serial No. 597,181

5 Claims. (Cl. 260—448)

The present invention relates to the preparation of extremely pure aluminum trialkyls which are suitable for the production of high purity alcohols and acids of any desired chain length and other derivatives thereof. More particularly this process relates to a novel series of process steps in the preparation of aluminum trialkyls which substantially eliminates the problem of contaminants in the final product.

As background for this process it is known that low molecular weight aluminum alkyls, e. g. aluminum triethyl, tripropyl, tributyl and triisobutyl, as well as aluminum alkyl hydrides mono- and di-, such as aluminum diethyl hydride, aluminum ethyl dihydride, may be reacted under certain conditions with a low molecular weight olefin, e. g. ethylene or propylene, to effect a build-up or what is known as a growth of the low molecular weight olefin onto the alkyl radicals of the aluminum compound forming a mixture of aluminum alkyls having increased chain lengths. This reaction, which will herein be referred to as the "growth reaction," produces higher molecular weight aluminum trialkyls having from 4 to 20 and more carbon atoms per alkyl group. In particular, when ethylene is used as the low molecular weight olefin, the resulting alkyl groups are entirely straight chain in form, with no side branches. The importance of such a reaction can be readily appreciated when it is realized that the higher molecular weight aluminum trialkyl may be further treated by oxidation and hydrolysis or with carbon dioxide and hydrolysis to form alcohols and acids. Such alcohols and acids, particularly the straight chain variety, are especially desirable as raw materials for plasticizers, detergents, alkyd resins, etc.

The growth stage is shown by the following reaction employing for illustration purposes aluminum triethyl and ethylene as the starting materials:

$$Al(CH_2CH_3)_3 + 3X(CH_2CH_2) \rightarrow Al-[(CH_2CH_2)_xCH_2CH_3]_3$$

It is to be understood that the alkyl radicals of the higher molecular weight aluminum trialkyls may be and are usually mixed and that the aluminum alkyl product is a smear of mixed aluminum trialkyls of various chain lengths from 4 to 20 carbon atoms each and more. The particular distribution and chain lengths are largely dependent on reaction conditions such as temperature, pressure, residence time and feed ratios. There is, however, a tendency during the growth reaction for the low molecular weight olefin, as in the above equation ethylene, to displace the higher molecular weight radicals of the aluminum trialkyls as they are formed. Thus in the growth stage it is difficult or impossible to avoid at least a 2–5% displacement reaction which ultimately results in the production of olefin contaminants which cover the entire molecular weight range (4 to 20+ carbon atoms) effecting a poor quality aluminum trialkyl product. Accordingly, a typical growth product will contain $Al(C_4-C_{20+} \text{ alkyl})_3$ plus 2 to 5% of $C_4-C_{20+}$ olefin. A clean separation of the olefins from the aluminum trialkyls is not possible by conventional means such as fractionation. The higher olefins, e. g. $C_{10+}$, boil at about the same temperatures as the lower aluminum trialkyls, e. g. aluminum triethyl, tripropyl, tributyl, etc. Also these olefins boil within the range of many of the alcohols and acids which may be prepared by this method and cannot be effectively removed from product alcohols by fractionation and other means of separating are impractical due to their prohibitive cost. Such olefins are highly undesirable contaminants in many of the uses of the alcohols and acids. It is the purpose of this invention to provide a process whereby this contamination of the product can be essentially completely avoided.

In accordance with this invention ethylene or another low molecular weight olefin is first grown onto a low molecular weight aluminum alkyl such as those noted above to produce a smear of higher molecular weight aluminum trialkyls contaminated with olefins as indicated above. The contaminated higher molecular weight aluminum alkyl mixture is then passed to a displacement reactor wherein under controlled conditions a lower molecular weight olefin is made to displace all of the higher alkyl radicals of the aluminum alkyl as illustrated in the following equation:

$$Al(C_6-C_{20+} \text{ alkyl})_3 + C_4H_8 \rightarrow Al(C_4H_9)_3 + C_6-C_{20+} \text{ olefins}$$

The mixture of $C_6-C_{20+}$ olefins and lower molecular weight aluminum trialkyl is then fractionated into the various olefins and the low molecular weight aluminum trialkyl. The individual olefins are then reacted under controlled conditions in a second displacement zone, either separately or in suitable combinations, with the low molecular weight aluminum trialkyl formed in the first displacement zone, whereby the $C_4-C_{20+}$ olefins are made to displace the alkyl radicals of the low molecular weight aluminum trialkyl as represented by the following illustrative equation:

$$Al(C_4H_9)_3 + 3C_{10}H_{20} \rightarrow Al(C_{10}H_{21})_3 + C_4H_8$$

The lower molecular weight olefin fed to the first displacement zone may have any desired number of carbon atoms depending upon the molecular weight distribution of the olefins which it is desired to recover from the first displacement zone product. For example, if it is desired to form appreciable quantities of $C_{16}$ to $C_{18}$ alkyl chains in the growth step and to recover the corresponding olefins from the product of the first displacement zone, it is preferred to use a $C_4$ olefin. This is because the aluminum tributyl formed in the first displacement zone is sufficiently high boiling to permit separation of $C_{16}-C_{18}$ olefins overhead by distillation. If it is desired to make higher molecular weight olefins, a $C_5$ or $C_6$ olefin can be used in the first displacement zone. Use of the latter would of course preclude recovery of $C_6$ olefins for conversion to aluminum trialkyls.

Any single olefin fraction or mixtures thereof may be used in the second displacement step to produce any desired aluminum trialkyl compound or product mixture.

Thus the end product of the present process is an aluminum trialkyl which is substantially free of olefin contaminants and wherein all of the alkyl radicals may have the same carbon chain length, if desired, instead of being a smear of various molecular weight aluminum trialkyls. Thus the individual molecular weight fractions may be converted separately to different types of products, if desired. The value of the instant process may be more fully appreciated with reference to the following equations which illustrate the preparation of desired alcohols and acids of varying molecular weight:

(1) $Al(R)_3 \xrightarrow{O_2} Al(OR)_3 \xrightarrow{H_2O} ROH$ (2)
$$Al(R')_3 \xrightarrow{CO_2} Al(O-\overset{O}{\underset{\|}{C}}R')_3 \xrightarrow{H_2O} R'\overset{O}{\underset{\|}{C}}-OH$$

For a more complete and better understanding of the invention reference will now be had to the attached drawing wherein the sole figure shows a flow diagram illustrating one embodiment of this invention.

Lower molecular weight aluminum alkyl feed is passed to growth reactor 1 via line 3. The aluminum alkyl for the growth stage will have the following formula:

$$Al \begin{matrix} \diagup R_1 \\ -R_2 \\ \diagdown R_3 \end{matrix}$$

wherein $R_1$ is a $C_2$–$C_4$ alkyl radical and $R_2$ and $R_3$ are $C_2$–$C_4$ alkyl radicals or hydrogen. Typical low molecular weight aluminum alkyls are aluminum triethyl, aluminum tripropyl, aluminum tributyl, aluminum triisobutyl, aluminum diethyl hydride, aluminum ethyl dihydride, other hydrides or mixtures thereof. Ethylene or another low molecular weight olefin is concomitantly passed into the growth reactor 1 via line 2. Due to the high heat of reaction cold ethylene feed is preferably injected into reactor 1 at various points through lines 4, 5 and 6 to control the temperature therein. It is also contemplated to employ cooled recycle ethylene gas through line 7 for additional flexibility in controlling the temperature. The growth reactor per se may be a pressure unit similar to those conventionally employed in the well known oxo or carbonylation process. Reactor 1 preferably contains several sections packed with ceramic, Raschig rings or other suitable material for obtaining good liquid-gas contact. Other well known means for obtaining good liquid-gas contacting, such as perforated or bubble cap trays or sprays, etc., may also be used.

In order to effect a build-up or growth of ethylene or other low molecular weight olefin onto the low molecular weight aluminum alkyl certain temperature and pressure conditions must be maintained. Generally temperatures between 185° to 260° F. and ethylene partial pressures between 300 to 3000 p. s. i. g. may be employed. However, preferred conditions are 210° to 230° F. and 1200 to 3000 p. s. i. g. ethylene partial pressure. Temperature control is considered especially important in the growth stage since at the higher temperatures premature displacement of the newly formed higher alkyl radicals by the lower molecular weight olefins is accentuated. However even when operating at relatively low temperatures at least some, e. g. 2–5%, of the higher molecular weight alkyl radicals are unavoidably displaced to form the aforementioned contaminants. Ethylene partial pressure will to some extent determine the amount of growth that occurs and accordingly the amount of reactants employed and pressures may be adjusted to produce the desired aluminum alkyls. For example, to obtain $C_6$–$C_{20+}$ alkyl chains 5–28 moles of ethylene per mole of low molecular weight aluminum alkyl should be employed. Higher molecular weight alkyl chains may be grown by employing a higher ratio of ethylene to aluminum alkyl. The residence time within reactor 1 will generally range from 1 to 9 hours. The reaction product from reactor 1 containing the higher molecular weight mixed aluminum trialkyls together with unreacted ethylene are then passed via line 8 to a high pressure liquid-gas separator 38. This high pressure separator is necessary when impure ethylene, for example ethylene containing small amounts of ethane, is employed in the growth reactor. Ethylene and ethane may be purged via line 9 to keep the ethylene concentration at a reasonably high value, for example 50% or greater. The ethylene-ethane mixture recovered from the liquid-gas separator may be cooled in cooler 10 and recycled via line 7 to the growth reactor as noted previously. The growth product comprising the higher molecular weight aluminum trialkyls is then passed from the liquid-gas separator via line 11 to a first displacement reactor 12. Low molecular weight olefin, preferably a $C_4$ to $C_6$ compound, is added to the displacement reactor via line 13 from sources which will be described below. Within the displacement reactor 12 under certain reaction conditions and using certain catalysts the low molecular weight olefin displaces the alkyl radicals of the higher molecular weight aluminum trialkyls to generate the corresponding higher olefins and lower molecular weight aluminum trialkyl. Temperatures and pressures to be maintained in displacement reactor 12 are 100° to 230° F. and 0 to 3000 p. s. i. g.

Nickel supported on an inert carrier such as kieselguhr, alumina, silica, etc., or a Raney nickel type have been found to be especially effective catalysts for the displacement reaction. However, in general the metals of the first transition series as well as the platinum group metals will also catalyze the desired displacement reaction. These catalysts may be supported on the inert carriers mentioned above or used as finely divided suspensions. When used in the finely divided condition, the catalysts are more effective in promoting the displacement reaction than when supported on a carrier. Supported catalysts may be of the well known commercial type containing 5–60% of active material. Preferably from 0.5–20 lb. feed/hr./lb. active component is employed.

Since the low molecular weight aluminum trialkyls are somewhat dangerous to handle certain safety features are desirably employed in the growth and displacement reactors 1, 12 and 29. An inert diluent such as an olefin, paraffin or aromatic compound is preferably used in order to avoid the possibility of spontaneous combustion. Typical diluents which may be employed include hexane, heptane, octane, benzene, toluene, hexene, heptene and the like.

The product mixture from displacement reactor 12 is then passed via line 39 through cooler 14 into fractionating tower 15 wherein the specific olefins are separated from each other and from the lower molecular weight aluminum trialkyl, e. g. aluminum tributyl, formed in displacement reactor 12. $C_6$–$C_{16+}$ olefins are taken from the fractionator 15 via lines 16, 17, 18, 19, 20 and 21 and passed into storage tanks. At this point the process may be operated under several alternate conditions. For example, if desired, $C_{12}$ olefins may be passed through valve 25 and line 28 and into a second displacement reactor 29. Concomitantly low molecular weight aluminum trialkyl formed in displacement reactor 12 is passed into tower 29 via line 30. Any single olefinic fraction or mixtures thereof may be employed at this point by control of valves 22, 23, 24, 25, 26 and 27. Conditions within displacement reactor 29 will be somewhat different from those maintained in displacement reactor 12 since in reactor 29 the higher molecular weight olefin will be displacing the low molecular weight alkyl radicals of the aluminum trialkyl instead of vice versa.

In displacement reactor 29, wherein excess high molecular weight olefin is reacted with aluminum tributyl or the like, the low molecular weight olefins formed are continuously removed overhead as they are formed to avoid an increase in their concentration which would stop the displacement reaction. Excess olefin is necessary in order to drive the reaction to the right, e. g.

$$Al(C_4 \text{ alkyl})_3 + C_{10} \text{ olefin} \rightleftarrows Al(C_{10} \text{ alkyl})_3 + C_4 \text{ olefin}$$

The light olefins are removed via line 31 and may be and preferably are employed as feed for displacement reactor 12. Make-up light olefin for displacement reactor 12 may be introduced at any of several points such as via line 36. The displacement reaction in reactor 29 is carried out ino the liquid phase at temperatures in the range of 100° to 250° F. and pressures of 0 to 100 p. s. i. g. Preferred conditions are 180° to 230° F. and 0 to 50 p. s. i. g. Under these conditions, the light displaced olefins are easily vaporized out of the reaction mixture. The product mixture from displacement reactor 29 comprising the higher molecular weight aluminum alkyls and some excess higher molecular weight olefin is passed via line 32 to fractionator 33 wherein the excess higher molecular weight olefin is taken overhead through line 34 and returned to displacement reactor 29 and the pure, olefin contaminant free aluminum trialkyl product is removed as a bottoms cut via line 35. Make-up low molecular weight aluminum trialkyl, if needed, may be added via line 37. No separation problem exists in the removal of excess higher molecular weight olefins from fractionator 33 since a $C_X$ olefin has a substantially lower boiling point than an aluminum trialkyl containing X carbon atoms per alkyl group. Thus as an example decene is easily separated from aluminum tridecyl by simple fractionation.

For purposes of illustration the following example sets forth an operative embodiment including the necessary conditions in all phases of the present process and product compositions from various stages of the operation:

EXAMPLE

| Process Conditions | Growth Reactor | First Displacement Reactor | Second Displacement Reactor |
|---|---|---|---|
| Temperature, °F | 230 | 170 | 240 |
| Total Pressure, p. s. i. g | 3,000 | 150 | Zero |
| $C_2H_4$ pp, p. s. i. g | 2,000 | | |
| Residence Time, Hrs | 3 | 2 | 2 |
| Catalyst | | 15% nickel on Kieselguhr | |
| Space Velocity | | 5 lbs. feed/hr./lb. nickel | |

Stream rates (relative wts.)

| | |
|---|---|
| Al $(C_4H_9)_3$ feed to growth reactor | 198 |
| $C_2H_4$ feed to growth reactor | 217 |
| Butene-1 feed to 1st disp. reactor (20% excess) | 201 |
| Products from 1st disp. reactor (incl. excess butene-1 and Al $(C_4H_9)_3$ | 587 |
| Total olefin product $C_{6+}$ | 383 |
| Total alkyl product Al$(C_6H_{13})_{3+}$ | 413 |
| Butene-1 made in 2nd disp. reactor | 168 |
| Make-up Al $(C_4H_9)_3$ | 2 |

Compositions

| Growth stage product: | Mole Percent |
|---|---|
| Al $(C_4H_9)_3$ | 1.0 |
| Al $(C_6H_{13})_3$ | 24.0 |
| Al $(C_8H_{17})_3$ | 31.4 |
| Al$(C_{10}H_{21})_3$ | 21.0 |
| Al$(C_{12}H_{25})_3$ | 11.2 |
| Al$(C_{14}H_{29})_3$ | 7.1 |
| Al (higher alkyls)$_3$ | 4.3 |
| | 100.0 |

First displacement reactor product

| | Without Excess Butene-1, Mole Percent | With Excess Butene-1, Mole Percent |
|---|---|---|
| Al$(C_4H_9)_3$ | 25.2 | 21.9 |
| $C_4H_8$ | | 13.1 |
| $C_6H_{12}$ | 18.1 | 15.8 |
| $C_8H_{16}$ | 23.7 | 20.5 |
| $C_{10}H_{20}$ | 15.7 | 13.8 |
| $C_{12}H_{24}$ | 8.5 | 7.4 |
| $C_{14}H_{28}$ | 5.4 | 4.7 |
| Higher Olefins | 3.4 | 2.8 |
| | 100.0 | 100.0 |

What is claimed is:

1. A method of preparing an extremely pure aluminum trialkyl having from 6 to 20 carbon atoms per alkyl group which comprises reacting in a first zone a low molecular weight olefin containing 2 to 4 carbon atoms per molecule with a low molecular weight aluminum alkyl selected from the group consisting of aluminum trialkyls, aluminum dialkyl hydrides and aluminum alkyl dihydrides at elevated temperatures and pressures to produce higher molecular weight aluminum alkyls wherein the alkyl radicals contain from 6 to 20 carbon atoms per radical, passing the product mixture from said first zone into a second zone and introducing a low molecular weight olefin having from 4 to 6 carbon atoms per molecule, displacing the alkyl radicals of the higher molecular weight aluminum alkyls with said low molecular weight olefin having from 4 to 6 carbon atoms per molecule, displacing the alkyl radicals of the higher molecular weight aluminum alkyls with said low molecular weight olefin having from 4 to 6 carbon atoms per molecule, fractionating the resulting higher molecular weight olefins into olefinic fractions having different carbon chain lengths and reacting at least one of said olefinic fractions with a low molecular weight aluminum trialkyl to displace the alkyl radicals of the low molecular weight aluminum trialkyl with the higher molecular weight olefin in said olefinic fraction and separating substantially olefin-free higher molecular weight aluminum trialkyl product.

2. In a method of preparing aluminum trialkyls wherein a low molecular weight olefin is reacted with a low molecular weight aluminum alkyl selected from the group consisting of aluminum trialkyls, aluminum dialkyl hydrides and aluminum alkyl dihydrides at elevated temperatures and pressures to form a mixture of higher molecular weight aluminum trialkyls the improvement which comprises reacting said mixture of higher molecular weight aluminum trialkyls with a $C_4$–$C_6$ olefin at elevated temperatures and pressures in the presence of a catalyst to generate olefins corresponding in carbon chain length to the alkyl radicals of the aluminum trialkyl and to form an aluminum trialkyl containing 4 to 6 carbon atoms per alkyl group, fractionating the thus generated olefins, reacting an excess of at least one of said olefin fractions with a low molecular weight aluminum trialkyl at elevated temperatures whereby an aluminum trialkyl wherein each alkyl group contains a number of carbon atoms corresponding to the olefins in said olefin fraction is formed and separating pure aluminum trialkyl from excess olefin.

3. A process which comprises reacting in a growth zone a $C_2$–$C_4$ olefin with a low molecular weight aluminum alkyl selected from the group consisting of aluminum trialkyl, aluminum dialkyl hydrides and aluminum alkyl dihydrides at 185° to 260° F. and 300 to 3000 p. s. i. g. olefin partial pressure for 1 to 9 hours, passing the resulting aluminum alkyl product mixture to a first displacement zone, reacting said aluminum trialkyl product mixture with a $C_4$–$C_6$ olefin at 100° to 230° F. and 0 to 3000 p. s. i. g. in the presence of a displacement catalyst whereby the $C_4$–$C_6$ olefin replaces the alkyl groups in the aluminum trialkyl product from said growth zone, fractionating the thus generated olefins into cuts of different molecular weight and reacting at least one of said olefin fractions with an aluminum trialkyl containing 4 to 6 carbon atoms per alkyl group in a second displacement zone at 100° to 250° F. and 0 to 100 p. s. i. g. in the presence of a displacement catalyst whereby product aluminum trialkyl containing the same number of carbon atoms as the olefin fraction is formed, removing excess olefin and recovering aluminum trialkyl containing 6 to 20 carbon atoms per alkyl group free of olefin contaminants.

4. A process in accordance with claim 3 wherein the $C_2$–$C_4$ olefin is ethylene and the $C_4$–$C_6$ olefin is butene.

5. A process in accordance with claim 3 wherein the aluminum alkyl employed before the first displacement zone is a compound of the following formula:

wherein $R_1$ is a $C_2$–$C_4$ alkyl radical and $R_2$ and $R_3$ are selected from the group consisting of $C_2$–$C_4$ alkyl and hydrogen.

No references cited.